UNITED STATES PATENT OFFICE 2,599,515

O-2,4,5-TRICHLOROPHENYL O,O-DIALKYL-PHOSPHATES

Clarence L. Moyle, Clare, Mich., assignor to The Dow Chemical Company, Midland, Mich., a corporation of Delaware No Drawing. Application March 30, 1950, Serial No. 152,975

3 Claims. (Cl. 260—461)

This invention is concerned with the O-2,4,5-trichlorophenyl O,O-dialkylphosphates having the formula

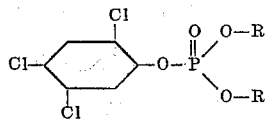

wherein R represents a methyl or ethyl radical. These new compounds are oily liquids, somewhat soluble in many organic solvents, and substantially insoluble in water. They are of value as toxic constituents of insecticide compositions.

The new compounds may be prepared by reacting O-(2,4,5-trichlorophenyl) dichlorophosphate of the formula

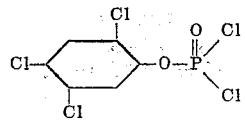

with an alkali metal methylate or an alkali metal ethylate. The reaction is carried out in an inert organic solvent and conveniently in the alcohol employed in the preparation of the alcoholate. Good results are obtained when employing two molecular proportions of the alcoholate with each molecular proportion of O - (2,4,5 - trichlorophenyl) dichlorophosphate. In practice, the alcoholate employed is preferably the sodium salt and may be prepared by reacting the desired alcohol with sodium in an inert organic solvent. The reaction between the alcoholate and O-(2,4,5-trichlorophenyl) dichlorophosphate may be accomplished by adding either reactant portionwise to the other dispersed in the reaction solvent.

The above operations are carried out with agitation and at a temperature of from 10° to 85° C. The reaction is somewhat exothermic, and temperature control is maintained by regulation of the rate of addition of the reactants, as well as by the addition or subtraction of heat, if required.

Upon completion of the reaction, the solvent is removed from the crude mixture by evaporation and the residue dispersed in a water-immiscible solvent such as benzene, carbon tetrachloride, or methylene dichloride. The resultant mixture is washed with water and dried with anhydrous sodium sulfate. The separation is then accomplished by evaporation of the solvent. If desired, the product may be further purified by fractional distillation under reduced pressure.

In an alternative method, the new compounds may be prepared by reacting O-(2,4,5-trichlorophenyl) dichlorophosphate with methanol or ethanol. The reaction is carried out in an inert organic solvent and in the presence of a neutralizing agent such as pyridine or sodium acetate. Good results are obtained when employing two molecular proportions of the desired alcohol and at least two molecular proportions of the neutralizing agent with each molecular proportion of O-(2,4,5-trichlorophenyl) dichlorophosphate. The reaction may be conveniently accomplished by adding O-(2,4,5-trichlorophenyl) dichlorophosphate portionwise to a mixture of the neutralizing agent, desired alcohol, and reaction solvent. The conditions of reaction and methods of separation are essentially as previously described.

The O-(2,4,5-trichlorophenyl) dichlorophosphate employed as a starting material may be prepared by reacting a molecular excess of phosphorus oxychloride (POCl₃) with an alkali metal 2,4,5-trichlorophenate. Good results are obtained when employing from 2 to 4 moles of phosphorus oxychloride per mole of 2,4,5-trichlorophenate. The phenate employed, preferably the sodium salt, is added portionwise with stirring to the phosphorus oxychloride and the mixture subsequently warmed for a short time to complete the reaction. The crude mixture is then filtered and the filtrate fractionally distilled under reduced pressure to separate the product.

The following examples illustrate the invention but are not to be construed as limiting:

EXAMPLE 1

O-2,4,5-trichlorophenyl O,O-dimethylphosphate

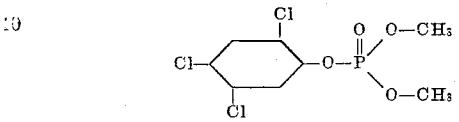

31.5 grams (0.1 mole) of O-(2,4,5-trichlorophenyl) dichlorophosphate (having a density of 1.67 at 24° C.) was added portionwise over a period of one-half hour with stirring to 14.8 grams (0.18 mole) of anhydrous sodium acetate, 12.8 grams (0.4 mole) of methanol and 52 milliliters of methylene dichloride. The addition was carried out at a temperature of from 25° to 33° C., and the resulting mixture subsequently warmed for 5 minutes at 38° to 43° C. to complete the reaction. The crude reaction product was then washed with water and the resulting mixture fractionally distilled under reduced pressure to obtain O-2,4,5-trichlorophenyl O,O-dimethylphosphate as a colorless oil. The latter had a boiling point of 151°–154° C. at 0.4 millimeters pressure, a density of 1.44 at 32° C., and a refractive index $n_D$ of 1.5335 at 35° C.

EXAMPLE 2

O-2,4,5-trichlorophenyl O,O-diethylphosphate

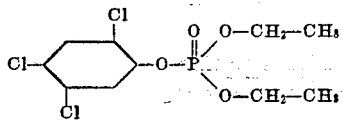

4.6 grams (0.2) mole of sodium was dissolved in 78.9 grams (1.7 mole) of ethanol to prepare an alcoholic solution of the corresponding alcoholate. This solution was added portionwise with stirring to 31.5 grams (0.1 mole) of O-(2,4,5-trichlorophenyl) dichlorophosphate (boiling at 143° to 154° C. at 3 millimeters pressure) dissolved in 100 milliliters of ethanol. The addition was carried out over a period of 8 minutes and at a temperature of from 11° to 19° C. The methanol was then removed by evaporation, and the residue dispersed in methylene dichloride. The resulting dispersion was washed twice with water, and dried with anhydrous sodium sulfate. The methylene dichloride was then removed by evaporation, and the residue fractionally distilled under reduced pressure to obtain O-2,4,5-trichlorophenyl O,O-diethylphosphate as a colorless oil. The latter had a boiling point of 157° to 158° C. at 0.7 millimeters pressure, a density of 1.38 at 33° C., and a refractive index $n_D$ of 1.5129 at 35° C.

These new O-2,4,5-trichlorophenyl O,O-dialkylphosphate compounds have been found effective as insecticides and are adapted to be employed for the control of agricultural and household pests. In representative operations, the products of the preceding examples have been tested for the control of two-spotted spider mite, Mexican bean beetle, and Southern army worm. Against these organisms, 100 per cent kills have been obtained with spray compositions containing from 0.12 to 2 pounds of toxicant per 100 gallons of solution. Such spray mixtures have contained the new products in combination with representative wetting and emulsifying agents.

I claim:

1. An O-2,4,5-trichlorophenyl O,O-dialkylphosphate having the formula

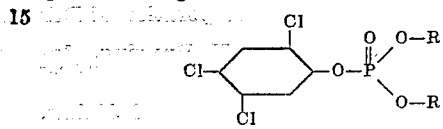

wherein R represents a member of the group consisting of the methyl and ethyl radicals.

2. O-2,4,5-trichlorophenyl O,O-dimethylphosphate.

3. O-2,4,5-trichlorophenyl O,O-diethylphosphate.

CLARENCE L. MOYLE.

REFERENCES CITED

The following references are of record in the file of this patent:

UNITED STATES PATENTS

| Number | Name | Date |
|---|---|---|
| 2,508,335 | Moyle et al. | May 16, 1950 |
| 2,520,393 | Fletcher | Aug. 29, 1950 |

FOREIGN PATENTS

| Number | Country | Date |
|---|---|---|
| 326,137 | Great Britain | Feb. 28, 1930 |
| 333,561 | Great Britain | Aug. 11, 1930 |